(12) United States Patent
Yoon

(10) Patent No.: US 8,418,515 B2
(45) Date of Patent: *Apr. 16, 2013

(54) VALVE OPERATED BY A MASTER KEY

(75) Inventor: Jong Chan Yoon, Busan (KR)

(73) Assignee: BMT Co., Ltd., Busan (KR)

( * ) Notice: Subject to any disclaimer, the term of this patent is extended or adjusted under 35 U.S.C. 154(b) by 409 days.

This patent is subject to a terminal disclaimer.

(21) Appl. No.: 12/532,095

(22) PCT Filed: Jul. 9, 2007

(86) PCT No.: PCT/KR2007/003320
§ 371 (c)(1),
(2), (4) Date: Nov. 10, 2009

(87) PCT Pub. No.: WO2008/114908
PCT Pub. Date: Sep. 25, 2008

(65) Prior Publication Data
US 2010/0101286 A1    Apr. 29, 2010

(30) Foreign Application Priority Data
Mar. 20, 2007    (KR) .................. 10-2007-0027187

(51) Int. Cl.
*F16K 35/00* (2006.01)

(52) U.S. Cl.
USPC ............. 70/176; 70/201; 70/387; 70/389; 70/429; 137/385

(58) Field of Classification Search ........... 70/175–180, 70/201, 387, 350–352, 422, 429, 430, 389, 70/DIG. 14; 137/383, 384.2, 384.4, 384.6, 137/384.8, 385; 251/89, 94, 95, 101, 102, 251/104–106, 110
See application file for complete search history.

(56) References Cited

U.S. PATENT DOCUMENTS

| | | | | |
|---|---|---|---|---|
| 102,290 A | * | 4/1870 | Maxwell | 70/176 |
| 414,154 A | * | 10/1889 | Haines | 70/176 |
| 557,943 A | * | 4/1896 | Bayley et al. | 251/110 |
| 576,956 A | * | 2/1897 | Doyle | 70/176 |
| 606,680 A | * | 7/1898 | O'Sullivan | 70/176 |
| 671,984 A | * | 4/1901 | Tiernan | 70/176 |
| 703,564 A | * | 7/1902 | Ellison | 70/179 |
| 705,419 A | * | 7/1902 | Merrill | 251/104 |
| 725,660 A | * | 4/1903 | Biot | 251/105 |

(Continued)

FOREIGN PATENT DOCUMENTS

| | | | |
|---|---|---|---|
| EP | 0472937 | * | 3/1992 |
| GB | 2207219 | * | 1/1989 |

(Continued)

*Primary Examiner* — Lloyd Gall
(74) *Attorney, Agent, or Firm* — Birch, Stewart, Kolasch & Birch, LLP

(57) ABSTRACT

A valve which is controlled using a master key such that only an authorized person is able to turn the valve on and off. The valve is constructed such that a fluid passage is controlled by rotating a handle relative to a body, including a locking device for maintaining a locked state of the handle relative to the body. A master key slot, which extends to the locking device, is formed in the handle, so that, when the master key is inserted into the master key slot, the locked state of the handle is released such that the fluid passage can be controlled by the rotation of the handle.

4 Claims, 3 Drawing Sheets

U.S. PATENT DOCUMENTS

| | | | | |
|---|---|---|---|---|
| 753,349 | A * | 3/1904 | Bacon | 70/176 |
| 834,429 | A * | 10/1906 | Wiggs | 70/176 |
| 861,501 | A * | 7/1907 | Case | 251/106 |
| 924,423 | A * | 6/1909 | Brandenburg | 70/176 |
| 1,024,180 | A * | 4/1912 | Bridges | 70/176 |
| 1,231,164 | A * | 6/1917 | Jahns et al. | 137/384 |
| 1,379,292 | A * | 5/1921 | Szameit | 137/384.6 |
| 1,405,144 | A * | 1/1922 | Moffitt | 70/429 |
| 1,412,720 | A * | 4/1922 | Szafranski | 70/176 |
| 1,436,207 | A * | 11/1922 | Spencer | 222/153.14 |
| 1,437,369 | A * | 11/1922 | Tallman | 251/106 |
| 1,618,752 | A * | 2/1927 | Cragg | 70/215 |
| 1,787,401 | A * | 12/1930 | Spangler | 137/385 |
| 1,915,565 | A * | 6/1933 | Wise | 70/172 |
| 2,132,315 | A * | 10/1938 | Newell | 137/384.2 |
| 2,994,503 | A * | 8/1961 | Smith | 251/110 |
| 5,697,239 | A * | 12/1997 | Hanneman et al. | 70/493 |
| 6,644,078 | B1 * | 11/2003 | Hung | 70/491 |
| 2010/0218830 | A1 * | 9/2010 | Yoon | 137/385 |

FOREIGN PATENT DOCUMENTS

| | | |
|---|---|---|
| JP | 59-125668 A | 7/1984 |
| JP | 2004-11880 A | 1/2004 |
| KR | 20-0388434 Y1 | 6/2005 |

* cited by examiner

VALVE OPERATED BY A MASTER KEY

BACKGROUND OF THE INVENTION

1. Technical Field

The present invention relates generally to valves for controlling the flow of fluid and, more particularly, to a valve which is controlled using a master key such that only an authorized person is able to control the valve.

2. Background Art

As well known to those skilled in the art, in many industries, pipes are widely used to carry material such as liquid or gas. Generally, valves are provided on the pipes to control the flow of fluid. Various kinds of valves have been devised and are used. Such valves serve to turn on or off the flow of fluid or adjust the flow rate.

Particularly, the present invention is a technique pertaining to valves provided with handles so that fluid passage through the valves is controlled by rotating the handles. The general construction of such a valve is well known, therefore a detailed explanation is deemed unnecessary.

Meanwhile, a valve was proposed in Korean Utility Model Registration No. 388434, which is entitled "ON/OFF VALVE HAVING HANDLE STOPPER", by the applicant of the present invention.

The present invention is based on this technique and improves it. The technique of Korean Utility Model Registration No. 388434 will be described in brief herein below as a prior art related to the present invention. The usefulness of the present invention will be appreciated in light of this description.

FIG. 1 is a schematic sectional view showing the construction of the on/off valve according to the conventional technique. The construction of the on/off valve will be explained herein below.

The on/off valve according to the conventional technique includes a main body 1, which has an inlet and an outlet therein, and a rotator 30, which is installed at the center in the main body 1 and has therein a fluid passage corresponding to the inlet and the outlet. The on/off valve further includes a handle 2, which is coupled to the rotator 30 at a position spaced apart from the upper surface of the main body 1 by a predetermined distance, and serves to rotate the rotator 30. Furthermore, the conventional on/off valve further includes a handle stopper 10. The handle stopper 10 includes a stop pin 13, which is supported by an elastic means 12 placed in a seating hole 11 formed in the upper surface of the main body 1. In addition, the handle stopper 10 further includes a push lever 15, which contacts the upper end of the stop pin 13 and is inserted into a vertical hole 14 that corresponds to the seating hole 11 and is formed in the handle 2.

In the conventional on/off valve having the above-mentioned construction, the push lever 15 protrudes upwards from the upper surface of the handle 2. Therefore, when an operator pushes the push lever 15, the stop pin 13 is moved downwards, thus releasing the handle 2, which has been in the locked state.

However, because the conventional on/off valve has a structure such that the push lever 15 is exposed outside, anyone can control the valve. Therefore, the conventional on/off valve is problematic in that there is a likelihood of inappropriate control of the valve attributable to carelessness. In particular, in an industrial field requiring a high level of safety, there is the probability of a serious safety hazard due to carelessness or intentional manipulation by an outsider.

SUMMARY OF THE INVENTION

Accordingly, the present invention has been made keeping in mind the above problems occurring in the prior art, and an object of the present invention is to provide a valve which is constructed such that a person who is not authorized cannot control the valve, thus preventing a safety hazard.

Another object of the present invention is to provide a valve in which the degree of opening thereof can be adjusted, thus making it easy to control the flow rate.

Technical Solution

To accomplish the above objects, in an aspect, the present invention provides a valve to control a fluid passage using rotation of a handle relative to a body, comprising: a locking means for maintaining a locked state of the handle relative to the body; and a master key slot being formed in the handle and extending to the locking means, wherein, when a master key is inserted into the master key slot, the locked state of the handle is released to allow the fluid passage to be controlled by rotation of the handle.

Preferably, in the valve operated by the master key according to the present invention, the locking means may include: a stopper retractably protruding from an upper surface of the body, which contacts a lower surface of the handle, the stopper being supported by a spring; and a load pin inserted into a vertical hole formed in the handle such that a lower end of the load pin is in contact with the stopper and an upper end thereof is able to contact the master key, so that, when the master key is inserted into the master key slot, the load pin is moved downwards and pushes the stopper, thus releasing the locked state of the handle.

Furthermore, in the valve operated by the master key according to the present invention, the master key slot may extend from a sidewall or an upper surface of the handle to the upper end of the load pin.

In addition, in the valve operated by the master key according to the present invention, the locking means may include: a load pin inserted into a vertical hole, which is formed in the handle and vertically extends a predetermined length from a lower surface of the handle, with a diameter-reduced neck part formed in a sidewall of the load pin at a position adjacent to the upper end of the load pin, the load pin being inserted at a lower end thereof into a locking hole formed in an upper surface of the body; and a spring interposed between the upper end of the load pin and the vertical hole to bias the load pin downwards, wherein, when the master key is inserted into the master key slot formed in a sidewall of the handle, an end of the master key is fitted over the neck part of the load pin, so that, as the master key is inserted into the master key slot, the load pin is moved upwards and the lower end of the load pin is removed from the locking hole, thus releasing the locked state of the handle.

Preferably, in the valve operated by the master key according to the present invention, the handle may have therein an internal threaded part, which extends to the master key slot, to hold the master key, inserted into the master key slot, using a bolt tightened into the internal threaded part.

In another aspect, the present invention provides a valve, in which a plurality of stoppers is provided in the upper surface of the body, such that an angle at which the handle is rotated relative to the body is controlled to adjust a flow rate.

Furthermore, in the valve operated by the master key according to the present invention, the master key slot may have a circular or polygonal cross-section.

As well, a first end of the handle, in which the master key slot is formed, may have a predetermined length in a horizontal direction, and a second end thereof opposite the first end may extend longer than the first end.

Preferably, the stopper may have a breaking groove in a sidewall thereof.

Advantageous Effects

As described above, the present invention provides a valve, which is fundamentally prevented from malfunctioning due to the carelessness of an operator.

Furthermore, because a handle can be rotated in regular angular increments, the flow rate can be precisely adjusted, and the adjustment of flow rate is simplified.

Moreover, the valve of the present invention can prevent various safety hazards and economic loss induced by malfunction of the valve. Therefore, the present invention will contribute greatly to overall industry.

Figure 1:
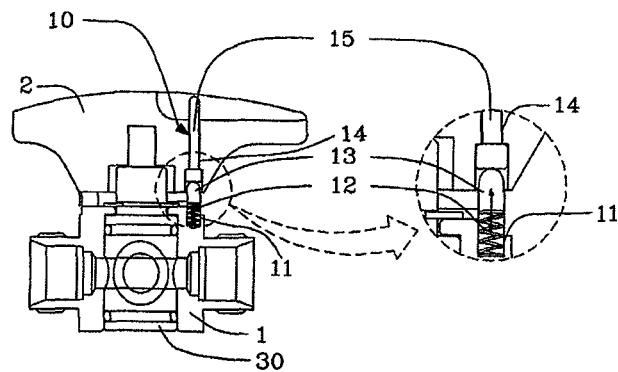
FIG. 1 is a schematic sectional view showing the construction of an on/off valve according to a prior art.

DESCRIPTION OF THE REFERENCE
NUMERALS IN THE DRAWING

100: body
110: locking hole
200: handle
210: master key slot
220: vertical hole
225: stop step
230: internal threaded part
300: locking means
310: stopper
315: breaking groove
320: load pin
325: neck part
330: spring
400: master key
500: fork tip

DETAILED DESCRIPTION OF THE INVENTION

Hereinafter, a valve operated by a master key according to the present invention will be described in detail with reference to the attached drawings, which pertain to embodiments of the present invention. The attached drawings are used merely as an example for ease of understanding of the technical spirit of the present invention, and the bounds of the present invention are not defined by the drawings.

Figure 2:
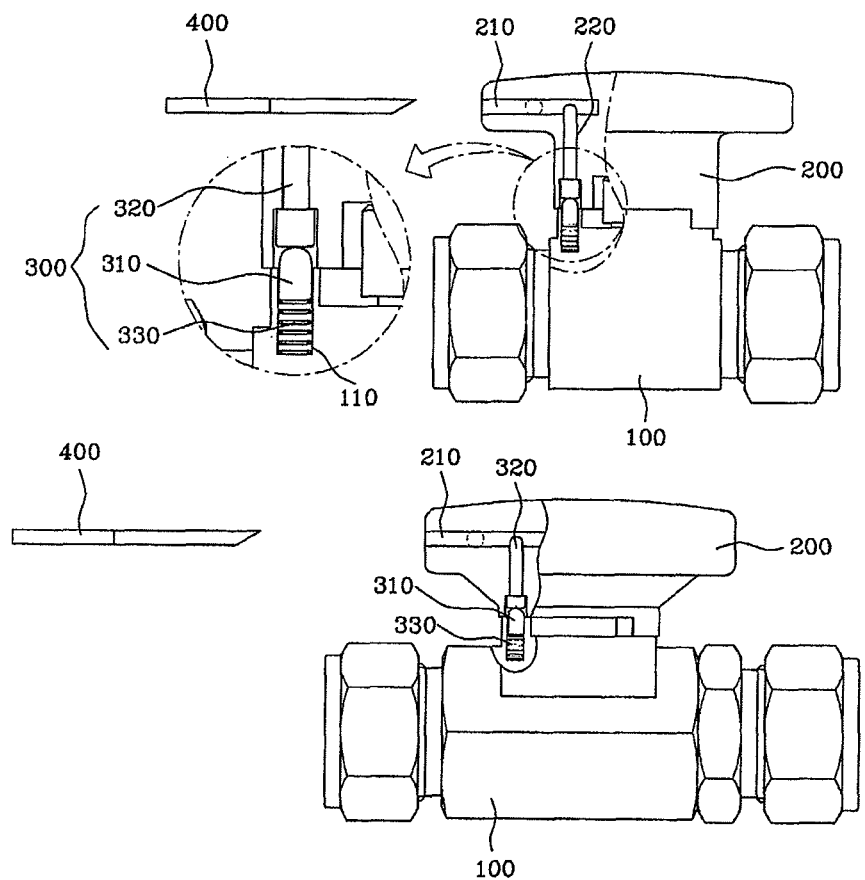
FIG. 2 is a schematic front view showing the basic construction of a valve according to a first embodiment of the present invention.
Figure 3:
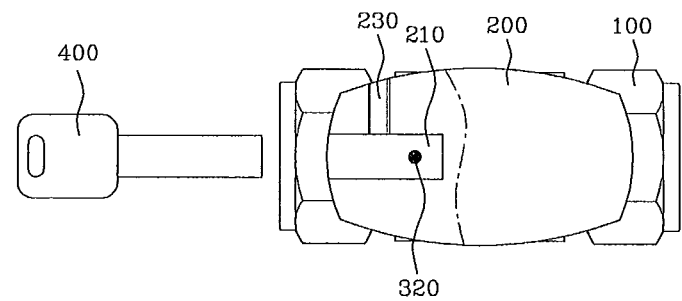
FIG. 3 is a schematic plan view showing the basic construction of the valve according to the first embodiment of the present invention.
Figure 3:
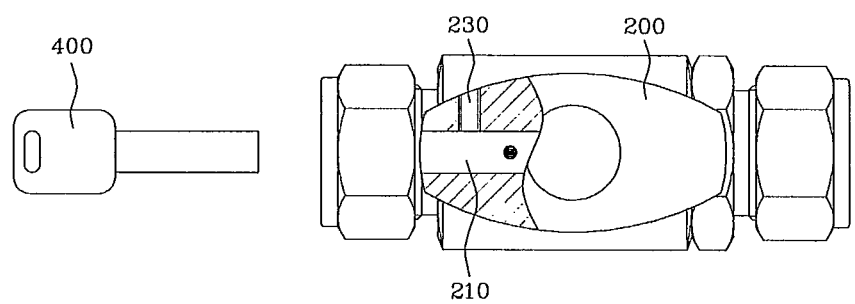

First, a first embodiment of the present invention will be described herein below. FIG. 2 is a schematic front view showing the basic construction of a valve controlled using a master key (hereinafter, referred to simply as "valve"), according to the first embodiment of the present invention. FIG. 3 shows the plan view of the valve.

In the present invention, a handle 200 is provided on the upper surface of a body 100 in which an inlet and an outlet are formed. A fluid passage defined in the body 100 is controlled by rotating the handle 200. A ball (not shown) or the like may be used as an on/off member, which is coupled to the handle 200 and operated in the body 100.

Furthermore, a locking means 300, which limits the rotation of the handle 200 with respect to the body 100, is provided throughout the body 100 and the handle 200. When the valve is in a state of being locked by the locking means 300, the handle 200 cannot be rotated. Only when the locked state is released can the handle 200 be rotated relative to the body 100. The detailed construction of the locking means 300 will be explained later herein.

Meanwhile, a master key slot 210 is formed in the handle 200. A master key 400 is inserted into the master key slot 210 to convert the state of the handle 200, of being locked by the locking means 300, into an unlocked state.

The valve according to the first embodiment of the present invention will be explained in more detail with reference to FIG. 2 or 3. The locking means 300 includes a stopper 310 and a load pin 320.

As shown in the drawings, the stopper 310 protrudes from the upper surface of the body 100 which contacts the lower surface of the handle 200. The stopper 310 is elastically supported by a spring 330 and thus retractably protrudes relative to the body 100. In detail, a locking hole 110 is formed in the upper surface of the body 100, and the spring 330 is inserted into the locking hole 110. The stopper 310 is placed onto the spring 330, so that, when external force is applied to the stopper 310, it is elastically inserted into the locking hole 110.

The load pin 320 is inserted into a vertical hole 220 formed in the handle 200 such that the load pin 320 is placed just above the stopper 310. The lower end of the load pin 320 is in contact with the upper end of the stopper 310. Furthermore, the upper end of the load pin 320 protrudes into the master key slot 210, which is horizontally formed in the sidewall of the handle 200. Therefore, when the master key 400 is inserted into the master key slot 210, the upper end of the load pin 320 is brought into contact with the master key 400. Then, the load pin 320 is moved downwards by downward force applied thereto, thus pushing downwards the stopper 310, which has been contacted the lower end of the load pin 320. As such, when the load pin 320 pushes the stopper 310 downwards using force transmitted from the master key 400, the handle 200, which has been in the locked state, enters an unlocked state, in which the handle 200 is allowed to be rotated, thus allowing an operator to rotate the handle 200 to open or close the valve.

In the first embodiment, although the master key slot 210, into which the master key 400 is inserted to control the locking means 300, has been illustrated as being formed in the sidewall of the handle 200 (in a horizontal direction), the master key slot 210 may be vertically formed in the handle 200 (from the upper end of the handle towards the lower end thereof).

Figure 4:
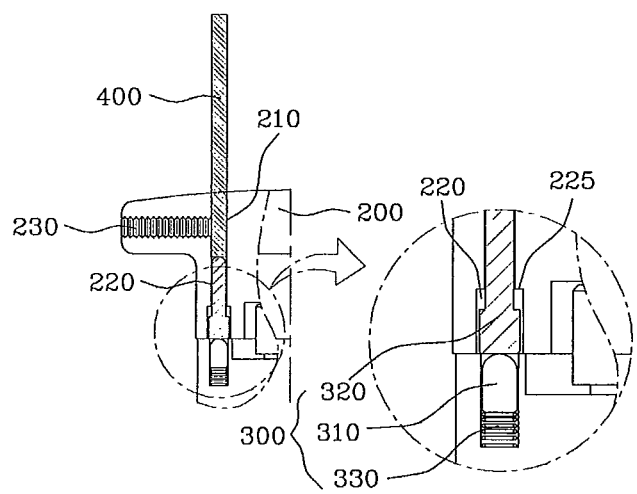
FIG. 4 is a partial sectional view showing the construction of a valve according to a second embodiment of the present invention.

The valve having the master key slot 210, which is formed in a vertical direction, will be illustrated as a second embodiment of the present invention. FIG. 4 is a partial sectional view showing the construction of the valve according to the second embodiment of the present invention.

As shown in the drawing, the master key slot 210 is formed in a handle 200 in a vertical direction from the upper surface of the handle 200 to an upper end of a load pin 320 constituting a locking means 300. The construction of the load pin 320, a stopper 310 and a spring 330 of the second embodiment is the same as that of the first embodiment. Preferably, a stop step 225, which limits the uppermost position of the load pin 320, is provided in a vertical hole 220, into which the load pin 320 is inserted. Such a stop step 225 may also be preferably provided in the first embodiment in the same manner as that of the second embodiment.

In the case of each of the first and second embodiments, it is constructed such that, when the master key 400 is inserted into the master key slot 210 and pushes the load pin 320, the load pin 320 is moved downwards by the master key 400, so that the stopper 310 enters the unlocked state. Therefore, preferably, an internal threaded part 230, which extends to the master key slot 210, is formed in the handle 200, and a bolt (not shown) is tightened into the internal threaded part 230 such that the master key 400 can maintain the state of being inserted in the master key slot 210. That is, this is useful when it is necessary to control the valve for a long time or to frequently conduct opening/closing operations, depending on the characteristics of the opening/closing manipulation of the valve.

Figure 5:
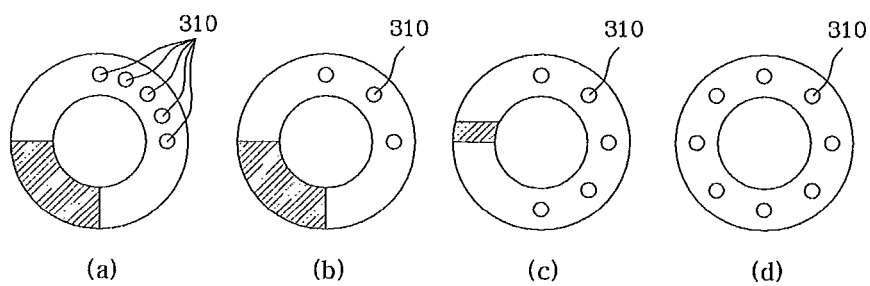
FIG. 5 is a plan view showing an upper surface of a body of the valve, in which stoppers are provided, according to the present invention.

Moreover, in the above-mentioned first and second embodiments, several stoppers 310 may be provided in the upper surface of the body 100, which contacts the handle 200, at positions spaced apart from each other at regular angular intervals. FIG. 5 is a plan view of the upper surface of the body 100 in which the stoppers 310 are provided, showing that the stoppers 310 can be provided in various arrangements.

The figure (a) of FIG. 5 illustrates an example, in which five stoppers 310 are provided within a range of 90°. In this case, the valve is rotatable to the maximum 90°, and the adjacent stoppers 310 are spaced apart from each other at intervals of 18°, so that the opening of the valve can be controlled in increments of 18°. The figure (b) of FIG. 5 illustrates another example, in which three stoppers 310 are provided within a range of 90°. The figure (c) of FIG. 5 illustrates another example, in which five stoppers 310 are provided within a range of 180°. The figure (d) of FIG. 5 illustrates another example, in which the valve is rotatable 360°.

As such, the valve of the present invention may be characterized in that the control of the flow rate can be precisely conducted using a construction having several stoppers.

Figure 6:
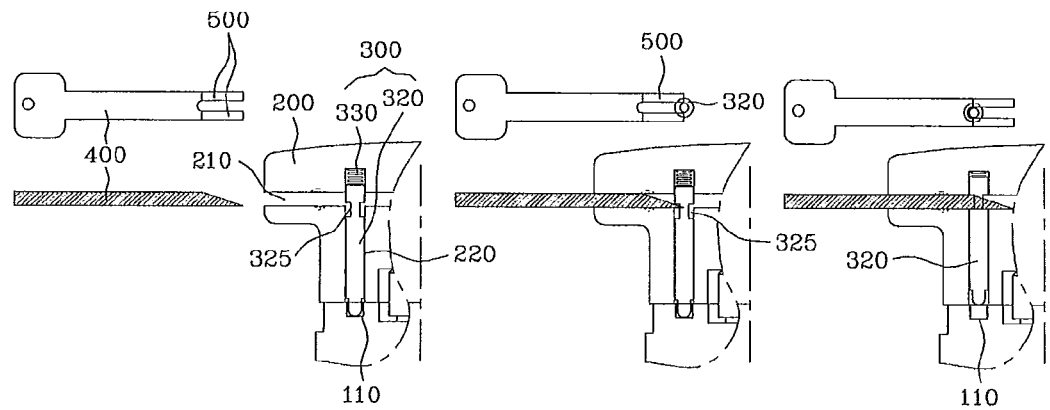
FIG. 6 is a sectional view showing a principal part of a valve, according to a third embodiment of the present invention.

Hereinafter, a valve according to a third embodiment of the present invention will be described. FIG. 6 is a sectional view showing a critical part of the valve according to the third embodiment of the present invention.

In the third embodiment, the locking means 300 includes a load pin 320 and a spring 330. The load pin 320 conducts the function of a stopper. In detail, the load pin 320 is inserted into a vertical hole 220, which is formed in a handle 200 and extends upwards from the lower surface of the handle to a predetermined position. A neck part 325, which is reduced in diameter, is formed in the sidewall of the load pin 320 at a position adjacent to the upper end thereof. The lower end of the load pin 320 is inserted into a locking hole 110, which is formed in the upper surface of the body.

The spring 330 is interposed between the vertical hole 220 of the handle 200 and the upper end of the load pin 320. Hence, the load pin 320 is biased downwards by the spring 330.

Furthermore, a master key slot 210 is formed in the sidewall of the handle 200. The load pin 320 is disposed such that the upper end of the neck part 325 of the load pin 320 is partially exposed to the master key slot 210. In other words, when the load pin 320 is disposed at the lowermost position and the handle 200 is thus in the locked state, the load pin 320 is in a state in which the neck part 325 is not completely removed from the master key slot 210.

As shown in FIG. 6, an end of the master key 400, which is inserted into the master key slot 210 to convert the locked state of the load pin 320 to the unlocked state, has a forked shape. In detail, a space is defined between two fork tips 500, and each fork tip 500 has an inclined shape such that the end thereof is pointed. When the master key 400 having the above-mentioned structure is inserted into the master key slot 210, the fork tips 500 of the master key 400 contact and then push the neck part 325 upwards. Thereafter, when the master key 400 is completely inserted, the load pin 320 is located at top dead center, so that the load pin 320 is completely removed from the locking hole 110. Thus, the handle 200 enters the rotatable state.

In this embodiment, an internal threaded part, which holds the master key 400, may also be formed in the handle 200, in the same manner as the prior embodiments. Preferably, a plurality of locking holes is formed in the upper surface of the body, such that the handle 200 can be manipulated by regular angular increments.

Meanwhile, in each of the above-mentioned embodiments, the shape of the master key slot 210, into which the master key 400 is inserted, can be variously modified. That is, the cross-section of the master key slot 210 may have a simple rectangular, circular or elliptical shape or, alternatively, may have various other shapes, such as a polygonal shape, a wave shape, etc. It is preferable that the master key 400 and the master key slot have a complex structure to ensure security such that only an authorized person can control the valve. In other words, it must be constructed such that only the correct master key 400 can be inserted into the master key slot.

Moreover, the handle of the valve according to the present invention is not limited to the above-mentioned embodiments. For example, depending on the place in which the valve is to be used or the size of the valve, a handle having a lever that extends a predetermined length in one direction may be used. In particular, in the case where a relatively large force is required to manipulate the valve, it is preferable that the handle have a length that can ensure sufficient torque.

Figure 7:
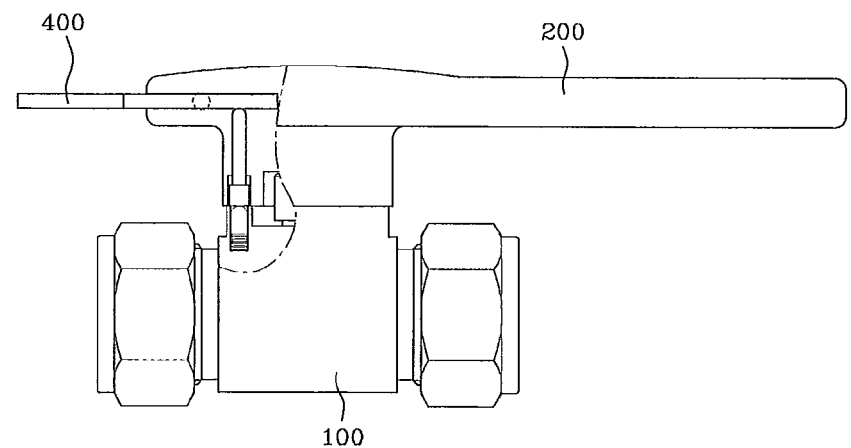
FIG. 7 is a front view of a valve, according to a fourth embodiment of the present invention.

Here, in a fourth embodiment of the present invention, such a modification of the handle will be explained in brief. FIG. 7 shows a partial sectional view of the handle according to the modification.

As shown in the drawing, one end of the handle 200 is relatively short, while the other end thereof is relatively long. In addition, a master key slot is formed in the short end of the handle 200 to control a load pin using a master key, in the same manner as that of the other embodiments described above. The operator holds the long end of the handle 200 opposite the short end, in which the master key slot is formed, and is able to easily manipulate the handle with a relatively small force.

Figure 8:
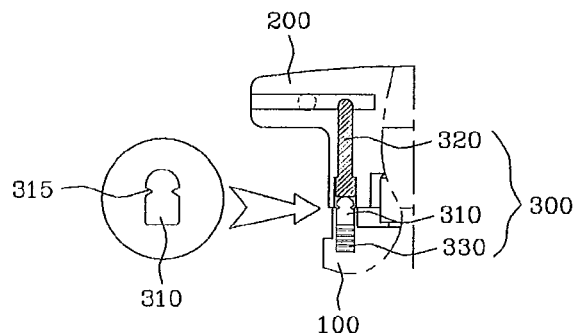
FIG. 8 is a sectional view showing a principal part of a valve, according to a fifth embodiment of the present invention.

Finally, a valve according to a fifth embodiment of the present invention will be described herein below. FIG. 8 is a sectional view showing a critical part of the valve according to the fifth embodiment of the present invention.

As shown in the drawing, the valve of this embodiment is characterized in that the shape of a stopper 310 differs from that of the other embodiments. In detail, in this embodiment, a locking means 300 includes a load pin 320, the stopper 310, and a spring 330. Here, a breaking groove 315 is formed in the sidewall of the upper end of the stopper 310.

Preferably, the breaking groove 315 is disposed at a position approximately corresponding to the boundary between a body 100 and a handle 200 when the stopper 310 is moved to the uppermost position. Furthermore, it is preferable that the breaking groove 315 has a ring shape that continuously extends in the circumferential direction along the sidewall of the stopper 310. Alternatively, the breaking groove 315 may be discontinuously formed in the stopper 310.

The reason why the breaking groove is formed in the stopper is that it may be required to forcibly release the locked state of the handle in an emergency, for example, when the valve must be controlled and the operator has lost the master key. That is, because the part of the stopper in which the breaking groove is formed is weakest, when an emergency occurs, the operator strikes the handle using a tool to break the grooved part of the stopper, thus releasing the locked state of the handle.

Hereinafter, the general operation of the valve of the present invention will be explained.

At an initial stage, the valve is in the locked state, and the handle is thus in an unrotatable state. To rotate the handle, the locked state thereof must be released. For this, the master key is inserted into the master key slot to move the load pin of the locking means upwards or downwards. Then, the locked state of the handle relative to the body is released.

After the handle has entered the unlocked state due to the use of the master key, the operator can rotate the handle to control the valve. In the case where the valve is provided with several stoppers, the opening of the valve can be controlled in regular angular increments, thus making it easy to control the flow rate.

The invention claimed is:

1. A valve to control fluid passage using rotation of a handle relative to a body, comprising:
    a locking mechanism configured to maintain a locked state of the handle relative to the body; said locking mechanism comprising: a load pin inserted into a vertical hole, which is formed in the handle and vertically extends a predetermined length from a lower surface of the handle, with a diameter-reduced neck part formed in a sidewall of the load pin at a position adjacent to the upper end of the load pin, the load pin being inserted at a lower end thereof into a locking hole formed in an upper surface of the body;
    a master key slot formed in the handle and extending to the locking mechanism, and a master key provided for use with the master key slot, wherein, when the master key is inserted into the master key slot formed in a sidewall of the handle, an end of the master key is fitted over the neck part of the load pin, so that, as the master key is inserted into the master key slot, the load pin is moved upwards and the lower end of the load pin is removed from the locking hole, thus releasing the locked state of the handle and allowing the fluid passage to be controlled by the rotation of the handle.

2. The valve as set forth in claim 1, wherein the master key slot has a circular or polygonal cross-section.

3. The valve as set forth in claim 1, wherein the handle has therein an internal threaded part, which extends to the master key slot, to hold the master key, inserted into the master key slot, using a bolt tightened into the internal threaded part.

4. The valve as set forth in claim 1, wherein a first end of the handle, in which the master key slot is formed, has a predetermined length in a horizontal direction, and a second end thereof opposite the first end extends longer than the first end.

* * * * *